(12) United States Patent
Jonna et al.

(10) Patent No.: US 8,468,334 B1
(45) Date of Patent: Jun. 18, 2013

(54) EFFICIENT INITIAL RAM DISK CREATION

(75) Inventors: Rajasekhar Jonna, Duluth, GA (US); Venkatesh Ramamurthy, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 215 days.

(21) Appl. No.: 13/015,642

(22) Filed: Jan. 28, 2011

(51) Int. Cl.
*G06F 9/00* (2006.01)
*G06F 9/24* (2006.01)
*G06F 15/177* (2006.01)

(52) U.S. Cl.
USPC .................................................. 713/2; 713/1

(58) Field of Classification Search
USPC ........................................................ 713/1, 2
See application file for complete search history.

(56) References Cited

U.S. PATENT DOCUMENTS

| | | | |
|---|---|---|---|
| 7,676,665 B2 * | 3/2010 | Wyatt | 713/1 |
| 2003/0110370 A1 | 6/2003 | Fish et al. | |
| 2004/0068645 A1 | 4/2004 | Larvoire | |
| 2005/0071620 A1 | 3/2005 | Natu | |
| 2005/0091349 A1 * | 4/2005 | Scheibli | 709/222 |
| 2006/0080522 A1 * | 4/2006 | Button et al. | 713/2 |
| 2006/0282651 A1 * | 12/2006 | Hobson | 713/1 |
| 2008/0064501 A1 * | 3/2008 | Patel | 463/40 |

OTHER PUBLICATIONS

Jones, MT, Linux initial RAM disk (initrd) overview, Jul. 31, 2006 [online][retrieved on Dec. 9, 2010] Retrieved from http://www.ibm.com/developerworks/linux/library/1-initrd.html, pp. 1-12.

U.S. Notice of Allowance/Allowability dated Dec. 31, 2012 in U.S. Appl. No. 12/871,238, First Named Inventor: Ramamurthy, Filing Date: Aug. 30, 2010.

* cited by examiner

*Primary Examiner* — Mark Connolly
(74) *Attorney, Agent, or Firm* — Hope Baldauff, LLC

(57) ABSTRACT

Operating system image files utilized to create an initial random access memory ("RAM") disk are separated into one image file that contains essential initial RAM disk components and one or more additional image files that contain optional initial RAM disk components, such as language support files. At runtime, the disk image containing the essential RAM disk components is loaded along with the disk images containing desired optional initial RAM disk components. Disk images containing undesired or unneeded optional RAM disk components are not loaded. The loaded disk images are utilized to create the initial RAM disk.

18 Claims, 9 Drawing Sheets

EFFICIENT INITIAL RAM DISK CREATION

BACKGROUND

Some operating systems, such as the LINUX operating system, utilize a two-stage boot process. During the first stage an initial random access memory ("RAM") disk is mounted. The initial RAM disk, which is sometimes referred to as the "initrd," is a temporary root file system that is mounted during system boot to support the two-stage boot process.

The initial RAM disk contains drivers, executable components, and other support files that permit a real file system to be mounted. During the second boot stage, a real root file system is mounted, the initial RAM disk is unmounted, and the real root file system is utilized for booting. In some embedded systems, the initial RAM disk is utilized as the real root file system.

The initial RAM disk frequently includes a number of optional components, many of which are not utilized at runtime. For instance, some initial RAM disk implementations include language support files, such as fonts and localization text strings, for many languages even though only a single language is typically utilized at runtime. The loading of an initial RAM disk that includes these optional components can cause a computer system to boot slower than it would if the optional components were not present.

It is with respect to these and other considerations that the disclosure made herein is presented.

SUMMARY

Technologies are described herein for efficiently loading operating system image files for creating an initial RAM disk. Through the utilization of the technologies and concepts presented herein, the operating system ("OS") image files utilized to create an initial RAM disk are separated into one image file that contains essential initial RAM disk components and one or more additional image files that contain optional initial RAM disk components, such as language support files. At runtime, the disk image containing the essential RAM disk components is loaded along with the disk images containing desired optional initial RAM disk components. Disk images containing undesired or unneeded optional RAM disk components are not loaded. The loaded disk images are then utilized to create the initial RAM disk. In this manner, the amount of data loaded to create an initial RAM disk is minimized and a faster computer system boot may result.

According to one aspect presented herein, a disk image is stored that contains components that are essential for creating an initial RAM disk (the "essential initial RAM disk components"). One or more disk images are also stored that contain optional initial RAM disk components. A disk image storing an OS kernel is also stored. In this manner, the essential components for creating an initial RAM disk are stored separately from optional components for creating the initial RAM disk.

At runtime, the optional initial RAM disk components that should be utilized to create the initial RAM disk are identified. For instance, a bitmap may be stored that identifies the optional initial RAM disk components that are to be loaded at runtime. The contents of the bitmap may be set by a setup utility, an application program, an OS, or in another manner.

Once the optional initial RAM disk components that should be utilized have been identified, the disk image containing the essential initial RAM disk components is loaded. The disk images containing the identified optional initial RAM disk components are then loaded into memory locations contiguous to the memory locations in which the essential initial RAM disk components were loaded. An in-memory file system, the initial RAM disk, is then created utilizing the loaded essential and optional initial RAM disk components.

In one implementation, a header is also stored that identifies the start and the end of the image file containing the essential RAM disk components. The header also identifies the start and end of each of the image files containing optional initial RAM disk components. The header might also include the bitmap that identifies the optional RAM disk components that are to be loaded.

In one implementation, the optional initial RAM disk components are language support files, such as fonts and localization text strings. In this implementation, a disk image is created for each language that contains the support files for that language. For instance, a disk image might be created storing support files for the English language, a second disk image might be created storing support files for the Japanese language, and other disk images might be created storing support files for other languages. At runtime, only the desired language support files are included in the initial RAM disk, thereby preventing the loading of unused language support files and reducing load time. It should be appreciated that the optional initial RAM disk components may include other types of optional initial RAM disk components.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
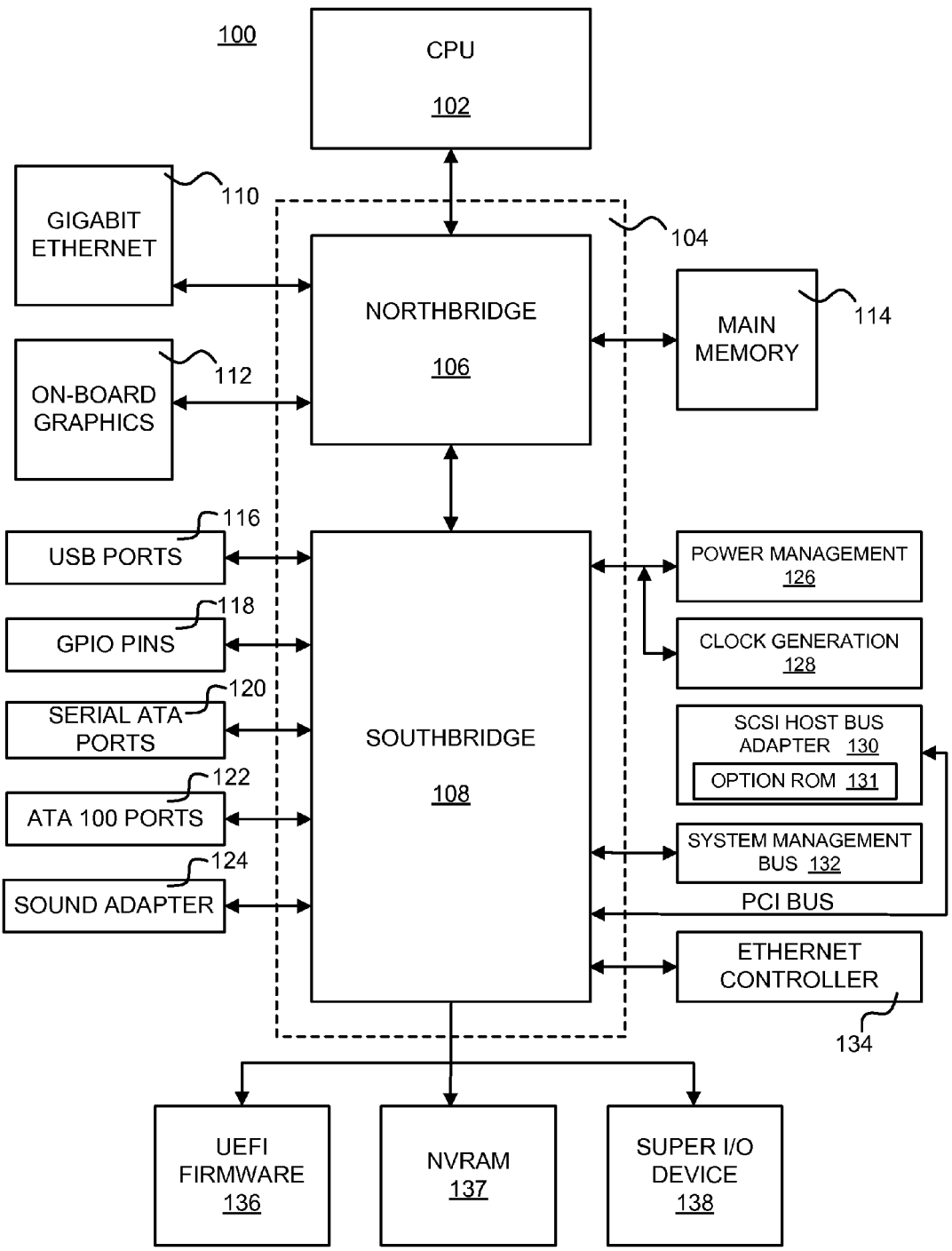
FIG. 1 is a computer architecture diagram that illustrates various components of a computer that provides an illustrative operating environment for the implementations presented herein.

Embodiments of the disclosure presented herein provide methods, systems, apparatuses, and computer-readable media for efficiently loading operating system image files to create an initial RAM disk. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing one or more of the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide a UEFI boot loader capable of loading non-UEFI compliant operating systems in a performant manner.

In order to provide the functionality described herein, the computer 100 can include a baseboard, or motherboard. The motherboard can be a printed circuit board to which a multitude of components or devices may be connected by way of a system bus or other electrical communication path. In one illustrative embodiment, a central processing unit ("CPU") 102 can operate in conjunction with a chipset 104. The CPU 102 may be a standard central processor that performs arithmetic and logical operations necessary for the operation of the computer.

The chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a BIOS boot system-compliant SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-readable storage media, provide non-volatile storage for the computer 100. Although the description of computer-storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. In one embodiment, the firmware 136 is a firmware that is compatible with the UEFI Specification. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

The computer 100 may be implemented as a conventional computer system, an embedded control computer, a laptop, or a server computer, a mobile device, a set-top box, a kiosk, a vehicular information system, a mobile telephone, a customized machine, or other hardware platform. The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

It should be appreciated that the program modules disclosed herein, including the firmware 136, may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computer 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 114, 136, 137 when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
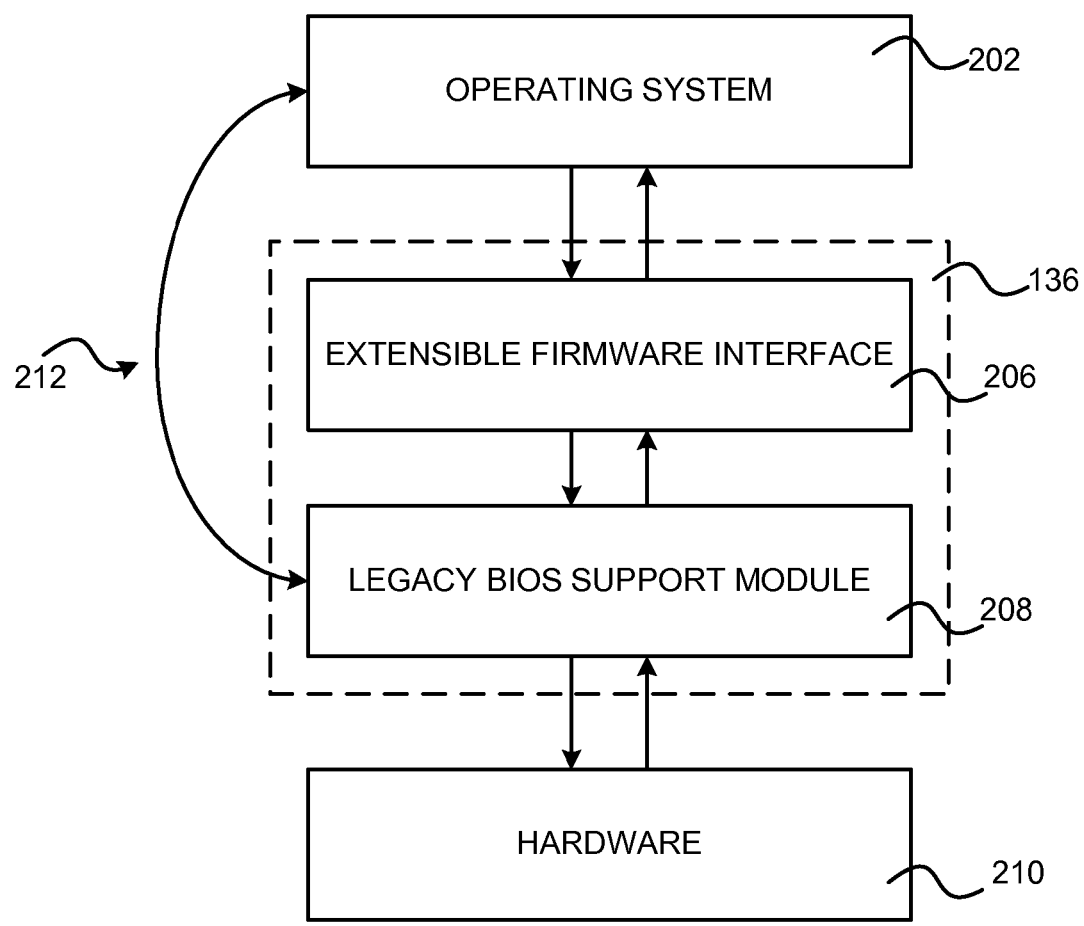
FIG. 2 is a block diagram illustrating aspects of an interface between a UEFI specification-compliant firmware and an operating system according to one or more embodiments presented herein.

Referring now to FIG. 2, a block diagram illustrates aspects of an interface between a UEFI firmware 136 and an operating system 202 according to one or more embodiments presented herein. As described with respect to FIG. 1, the firmware 136 may comprise a firmware compatible with the UEFI Specification (which may be referred to herein as the "Specification") from INTEL CORPORATION or from the UEFI FORUM. The UEFI Specification describes an interface between the operating system 202 and the system firmware 136. The UEFI Specification also defines an interface that platform firmware may implement, and an interface that the operating system 202 may use while booting. How the firmware 136 implements the interface may be left up to the manufacturer of the firmware. The Specification can define a way for the operating system 202 and firmware 136 to communicate information necessary to support the operating system boot process.

According to some embodiments, both a UEFI-compatible firmware 206 and a legacy BIOS support module 208 may be present in the UEFI firmware 136. This allows the computer 100 to support a UEFI firmware interface and a legacy BIOS firmware interface. In order to provide this functionality, an interface 212 may be provided for use by legacy operating systems and applications. According to other embodiments, only one of the UEFI-compatible firmware 206 and the legacy BIOS support module 208 may be present in the firmware 136. According to yet other embodiments, the firmware 136 may interface with the hardware 210 through any of various other architectures, components, or modules for the firmware without specific involvement of the UEFI-compatible firmware 206 or the legacy BIOS support module 208. Additional details regarding the operation and architecture of a UEFI Specification compliant-firmware can be found in the UEFI Specification and in the specifications that make up the EFI Framework, both of which are available from INTEL CORPORATION and are expressly incorporated herein by reference.

Figure 3:
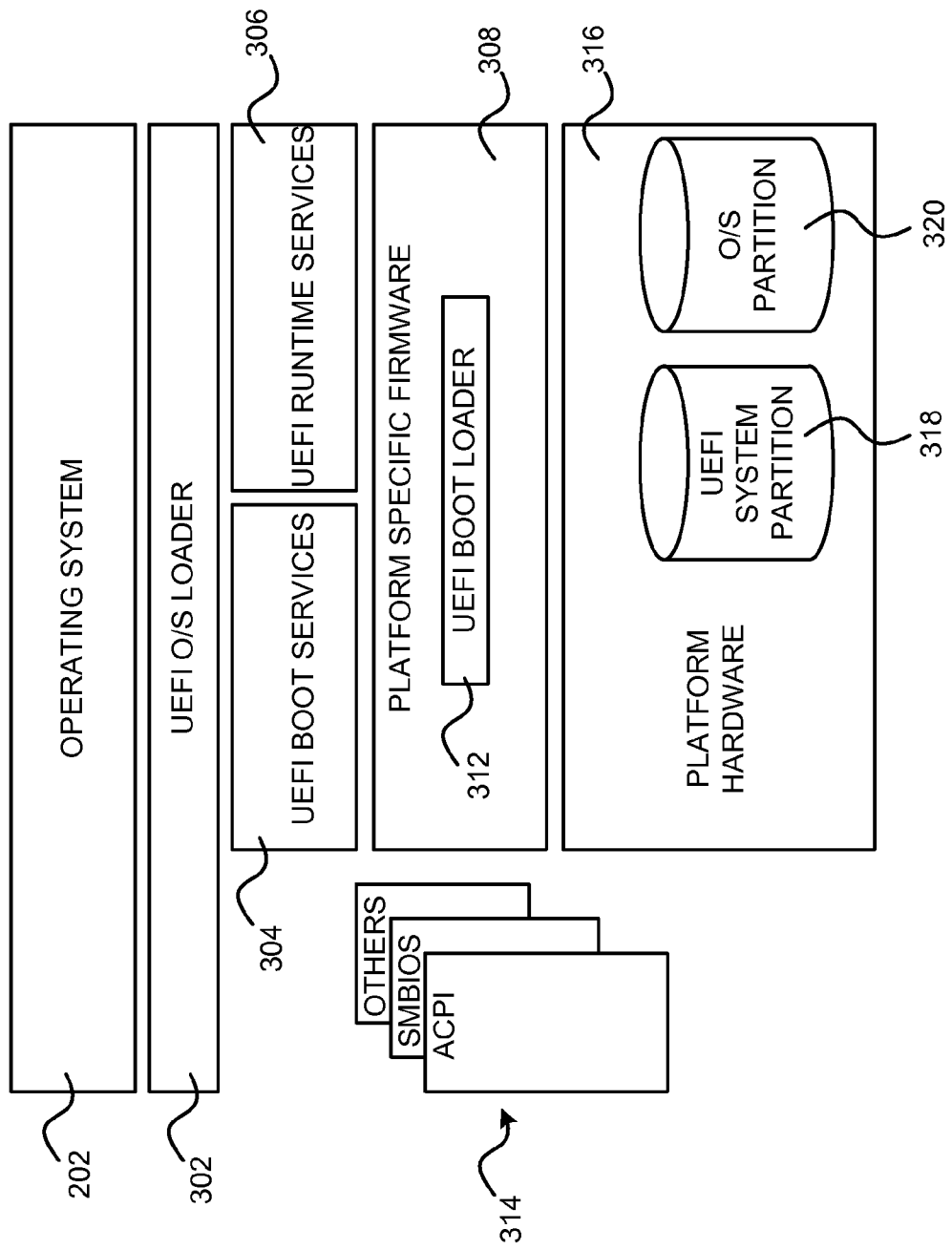
FIG. 3 is a block diagram illustrating an architecture for a UEFI specification-compliant firmware that provides an operating environment for one or more embodiments presented herein.

Turning now to FIG. 3, a block diagram illustrates the architecture for a UEFI specification-compliant firmware that provides an operating environment for one or more embodiments presented herein. As shown in FIG. 3, the architecture can include platform hardware 316 and an operating system 202. The platform specific firmware 308 may retrieve an operating system ("OS" or "O/S") image from the UEFI system partition 318 using an UEFI operating system loader 302. The UEFI system partition 318 may be an architecturally shareable system partition. As such, the UEFI system partition 318 can define a partition and file system designed to support safe sharing of mass storage between multiple vendors. An OS partition 320 may also be utilized.

Once started, the UEFI OS loader 302 may continue to boot the complete operating system 202. In doing so, the UEFI OS loader 302 may use UEFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI OS loader 302 during the boot phase. For example, a set of runtime services may be presented to ensure appropriate abstraction of base platform hardware resources used by the operating system 202 during its operation. UEFI allows extension of platform firmware by loading UEFI driver and UEFI application images which, when loaded, have access to UEFI-defined runtime and boot services.

Various program modules can provide the boot-time and run-time services. These program modules may be loaded by the UEFI boot loader 312 at system boot time. The UEFI boot loader 312 is a component in the UEFI firmware that determines which program modules should be explicitly loaded and when. Once the UEFI firmware is initialized, it passes control to the UEFI boot loader 312. The UEFI boot loader 312 may then determine which of the program modules to load and in what order.

Figure 4:
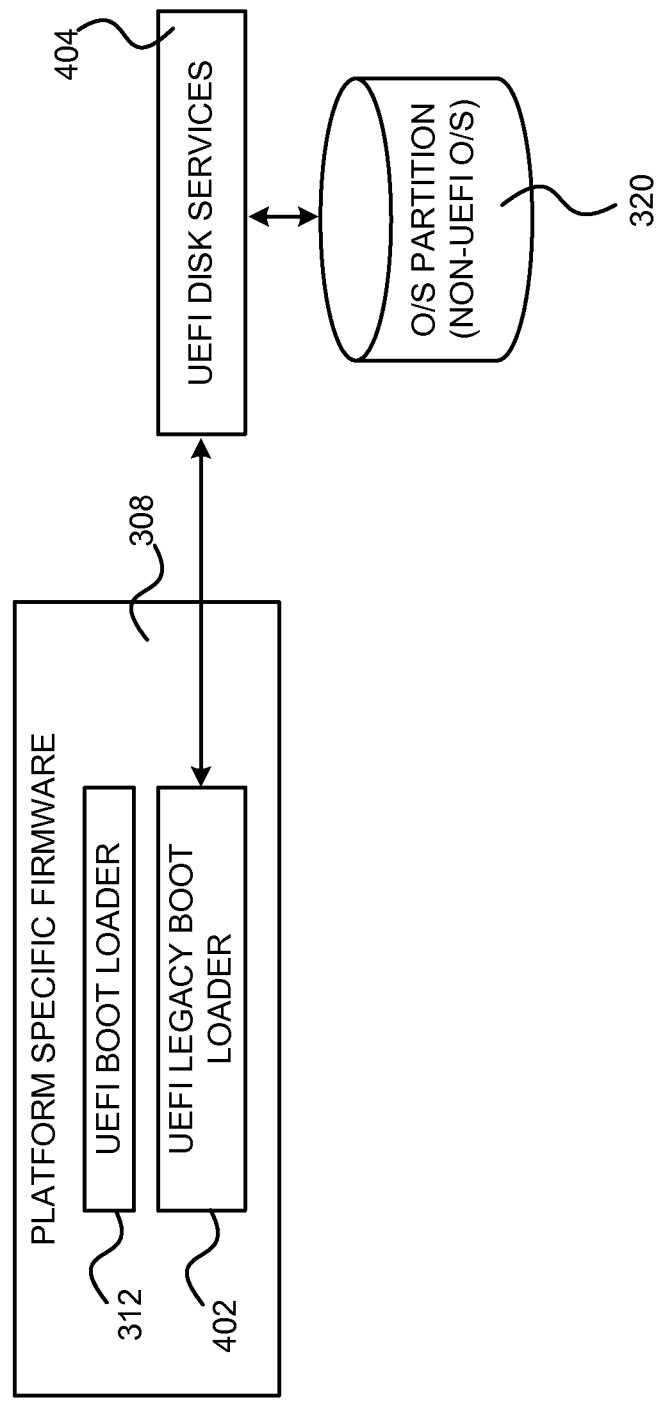
FIG. 4 is a block diagram illustrating additional aspects of an architecture for a UEFI specification-compliant firmware that includes a UEFI boot loader capable of loading a non-UEFI compliant operating system in one embodiment disclosed herein.

Referring now to FIG. 4, details will be provided regarding aspects of a UEFI legacy boot loader 402 provided in one embodiment disclosed herein. As illustrated in FIG. 4, the UEFI legacy boot loader 402 is provided as a part of the platform specific firmware 308 in one embodiment disclosed herein. As will be described in greater detail below, the UEFI legacy boot loader 402 is configured to load a non-UEFI compliant O/S 320 in a performant manner. In order to provide this functionality, the UEFI legacy boot loader 402 utilizes UEFI disk services 404. The UEFI disk services 404 utilize DMA to perform disk reads and writes in a performant manner. On certain systems, the UEFI disk services 404 may also execute as 64-bit code. This also might provide a performance gain. As will be described in greater detail below, the use of the UEFI disk services 404 allows an O/S to be loaded significantly faster than previous solutions that utilize an INT 13h mechanism. Additional details regarding this process will be provided below with regard to FIG. 5.

As will also be described in greater detail below, the UEFI boot loader 312 and the UEFI legacy boot loader 402 might also provide functionality for efficiently loading operating system disk images for creating an initial RAM disk. Details regarding this aspect of the operation of the UEFI boot loader 312 and the UEFI legacy boot loader 402 will be described below with respect to FIGS. 6-9.

Figure 5:
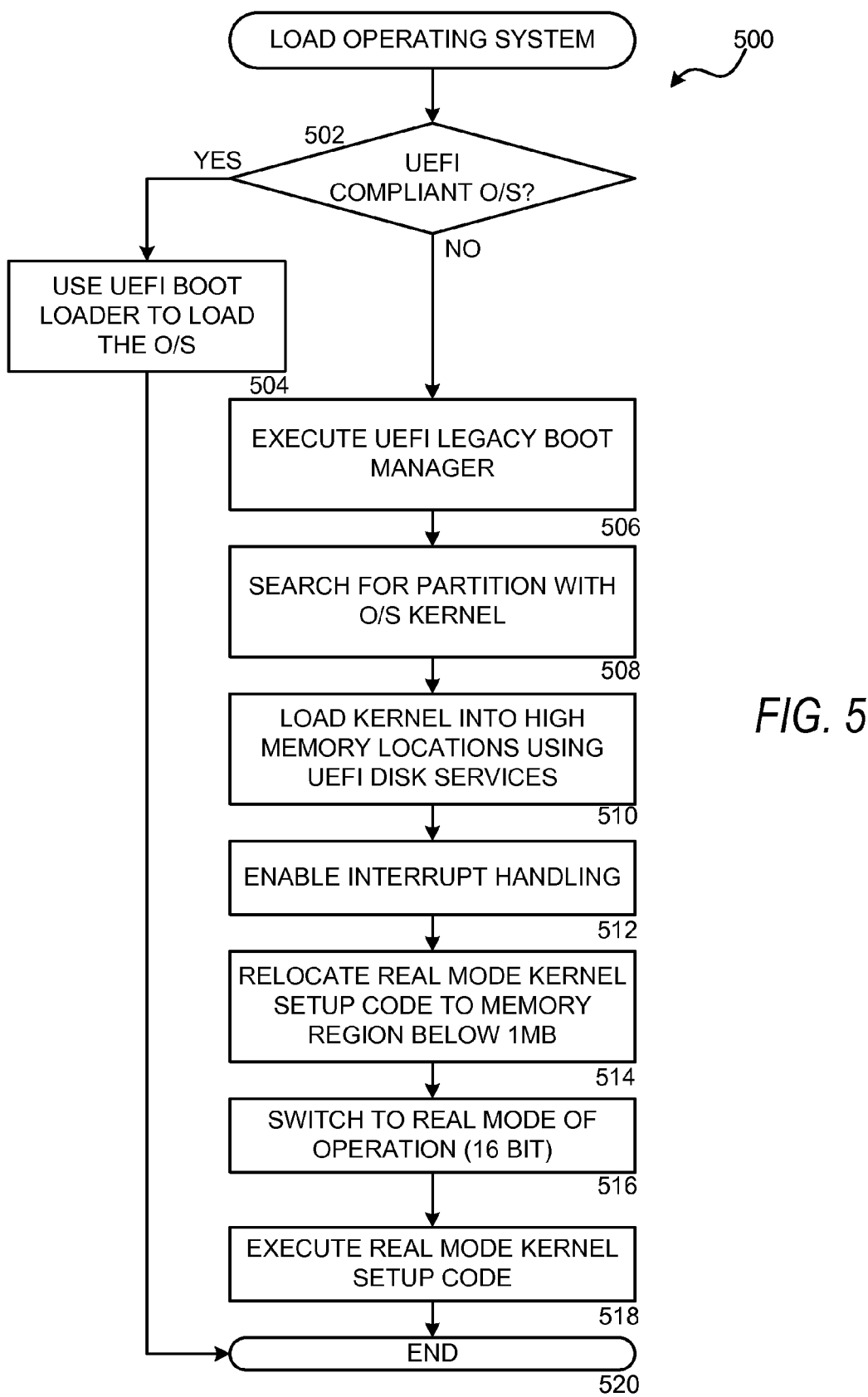
FIG. 5 is a flow diagram showing aspects of the operation of a UEFI compliant firmware that includes a UEFI boot loader capable of loading a non-UEFI compliant operating system in one embodiment disclosed herein.

Turning now to FIG. 5, additional details will be provided regarding the embodiments disclosed herein for providing a UEFI boot loader capable of loading a non-UEFI compliant operating system in a performant manner. In particular, FIG. 5 is a flow diagram showing a routine 500 that illustrates aspects of a process for loading a non-UEFI compliant operating system according to embodiments presented herein. The process illustrated in FIG. 5 may be performed by various components that make up the UEFI firmware 136 shown in FIG. 3.

It should be appreciated that the logical operations described herein with regard to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 502, where the UEFI firmware 136 determines whether a UEFI compliant operating system or a non-UEFI compliant operating system is to be loaded. If a UEFI compliant operating system is to be loaded, the routine 500 proceeds from operation 502 to operation 504. At operation 504, the UEFI boot loader loads the UEFI compliant operating system in a conventional fashion. The routine 500 then continues to operation 520, where it ends.

If, at operation 502, the UEFI firmware 136 determines that a non-UEFI compliant O/S is to be loaded, the routine 500 proceeds to operation 506. At operation 506, the UEFI legacy boot loader 402 is executed in a 32/64 bit protected mode like other UEFI applications/drivers. As discussed above, the UEFI legacy boot loader 402 provides functionality for the performant loading of a non-UEFI compliant O/S. Details of the operation of the UEFI legacy boot loader 402 are provided below with respect to operations 508-518.

From operation 506, the routine 500 proceeds to operation 508, where the UEFI legacy boot loader 402 searches for a disk partition with the O/S kernel to be loaded. FIG. 4, for instance, shows a partition 320 that contains a non-UEFI compliant O/S. The partition can be a regular file system (like NTFS, FAT, EXT2/EXT3/EXT4, BTRFS, etc.) or a special partition containing the O/S kernel and possibly other boot-related files as a raw dump. This partition type can either be one of the file system types, a recovery type, or another OEM type. Once the partition has been identified, the routine 500 proceeds from operation 508 to operation 510.

At operation 510, the UEFI legacy boot loader 402 loads the O/S kernel from the identified partition into high memory (>1 MB) using the UEFI disk services 404. As discussed briefly above, the UEFI disk services 404 utilize DMA to perform disk reads and writes in a performant manner. On certain systems, the UEFI disk services 404 may also execute as 64-bit code. The UEFI legacy boot loader 402 may also load other files, such as an initial RAM disk (discussed below with regard to FIGS. 5-9), drivers, a registry, and others. Once these files have been loaded into memory, the routine 500 proceeds from operation 510 to operation 512.

At operation 512, the UEFI legacy boot loader 402 enables interrupt handling for the non-UEFI compliant O/S. The routine 500 then proceeds to operation 514, where the UEFI legacy boot loader 402 relocates the O/S real mode kernel setup code to a low memory region (below 1 MB). The routine 500 then proceeds to operation 516, where the UEFI legacy boot loader 402 switches the CPU 102 to the real mode of operation. It should be appreciated that, in one embodiment, portions of the real mode kernel setup code are implemented in the UEFI firmware 136. In this implementation, it is not necessary to make a switch to 16-bit real mode.

Once the CPU has been switched to the real mode of operation, the routine 500 proceeds to operation 518, where the UEFI legacy boot loader 402 causes the real mode kernel setup code to be executed from the low memory area. The real mode kernel setup code then executes to complete the loading and initialization of the O/S. The routine 500 proceeds from operation 518 to operation 520, where it ends.

Figure 6:
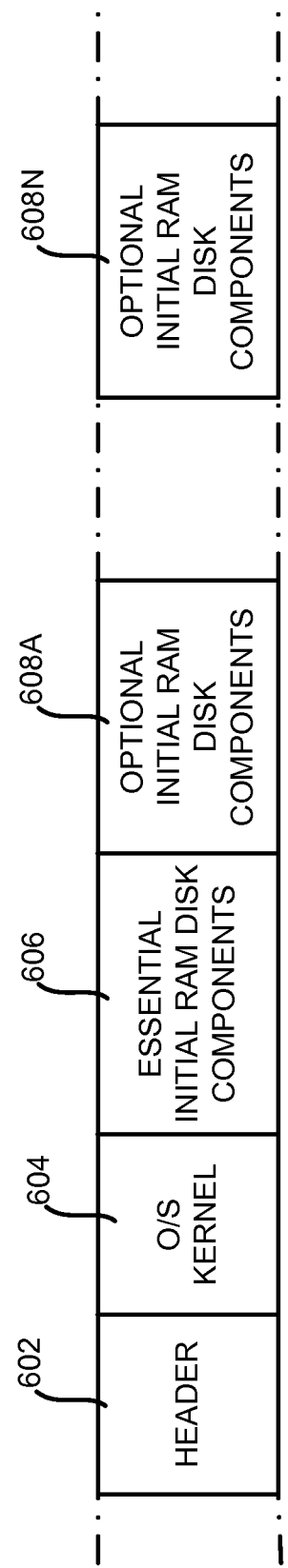
FIG. 6 is a data storage diagram showing aspects of the storage of a disk image storing essential initial RAM disk components and one or more disk images storing optional initial RAM disk components.

Turning now to FIG. 6, additional details will be provided regarding one embodiment disclosed herein for efficient initial RAM disk creation. In particular, FIG. 6 shows aspects regarding the storage of several disk images utilized in embodiments disclosed herein. As known to those skilled in the art, a disk image (which may be referred to herein simply as an "image") is a file containing the complete contents and structure representing a data storage medium or device, such as a hard drive, tape drive, floppy disk, or CD/DVD/BD disk. The disk images and other data shown in FIG. 6 or described below may be stored on disk or in a non-volatile memory device, such as the NVRAM 137.

The disk images and other data shown in FIG. 6 can be utilized to efficiently create an initial RAM disk. As discussed briefly above, an initial RAM disk, which is sometimes referred to as the "initrd," is a temporary root file system that is mounted during system boot to support a two-stage boot process. The initial RAM disk may contain drivers, executable components, and other support files that permit a real file system to be mounted. During the second boot stage, a real root file system is mounted, the initial RAM disk is unmounted, and the real root file system is utilized for booting. In some embedded systems, the initial RAM disk is utilized as the real root file system.

As shown in FIG. 6, a disk image 604 is stored in one embodiment that includes an operating system ("OS" or "O/S") kernel. As known in the art, an OS kernel is the central component of many operating systems. The OS kernel stored in the disk image 604 may be a kernel of a LINUX-based operating system or another type of operating system.

A disk image 606 is also stored in one embodiment that includes essential initial RAM disk components. The essential initial RAM disk components are components that are required by the OS kernel to be in the initial RAM disk. For instance, the disk image 606 might store drivers and other executable components required by the OS kernel. Optional initial RAM disk components are stored in the disk images 608A-608N. Optional initial RAM disk components are components that are not required by the OS kernel, but that may optionally be utilized.

In one embodiment disclosed herein, the optional initial RAM disk components stored in the disk images 608A-608N are language support files, such as fonts and localization text strings. In this implementation, a disk image is created for each language that contains the support files for that language. For instance, a disk image 608A might be created storing support files for the English language, a second disk image 608N might be created storing support files for the Japanese language, and other disk images might be created storing support files for other languages. As will be described in greater detail below, only the desired language support files are included in the initial RAM disk at runtime, thereby reducing load time. It should be appreciated that the optional initial RAM disk components may include other types of optional initial RAM disk components. It should also be appreciated while two disk images 608A and 608N for storing optional initial RAM disk components are shown in FIG. 6, many more such disk images might be utilized.

As shown in FIG. 6, a header 602 is also stored and utilized in one embodiment disclosed herein. As will be discussed in greater detail below, the header 602 includes data indicating the start and end of the disk image 604, the disk image 606, and the disk images 608A-608N. The header 602 might also store data identifying the optional initial RAM disk components that should be loaded into the initial RAM disk at runtime. For instance, the header 602 stores a bitmap in one embodiment that specifies the disk images 608A-608N that should be utilized at runtime. Details regarding the structure of the header 602 will be described below with regard to FIG. 7.

Figure 7:
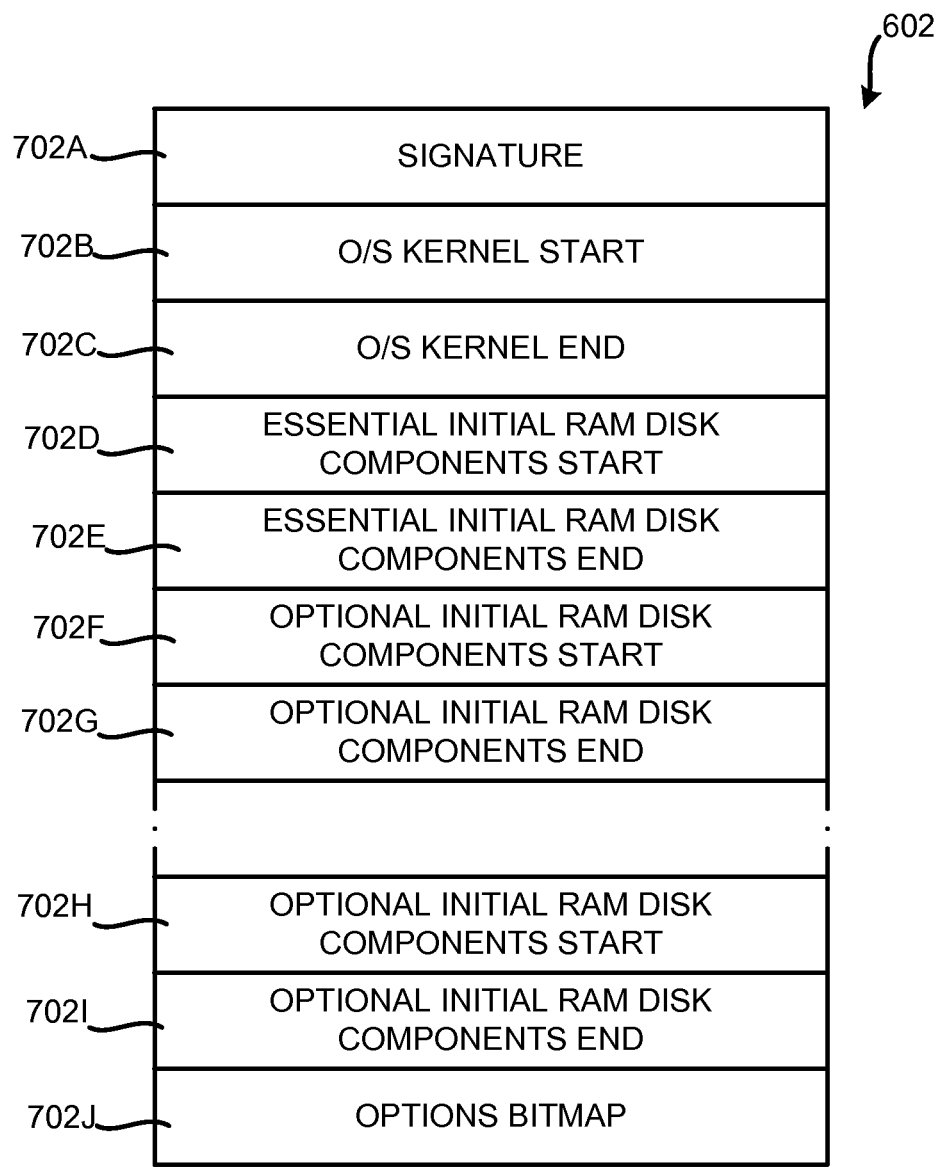
FIG. 7 is a data structure diagram showing aspects of a header utilized in one embodiment disclosed herein.

Referring now to FIG. 7, a data structure diagram showing aspects of a header 602 utilized in one embodiment disclosed herein will be described. In particular, the header 602 includes a field 702A for storing a signature that identifies the header 602. The header 602 also includes the fields 702B and 702C that identify the starting and ending location of the disk image 604 storing the OS kernel, respectively. The header 602 also includes the fields 702D and 702E for storing the starting and ending location of the disk image 606 storing the essential initial RAM disk components.

As shown in FIG. 7, the header 602 also includes fields storing data identifying the starting and ending locations of each of the disk images storing optional initial RAM disk components. For instance, in the example shown in FIG. 7, the fields 702F and 702G are utilized to store the starting and ending location, respectively, of the disk image 608A. the fields 702H and 702I are utilized to store the starting and ending location of the disk image 608N. It should be appreciated that the header 602 might include other fields for storing the starting and ending location of additional disk images storing optional initial RAM disk components.

The header 602 shown in FIG. 7 also stores data identifying the disk images containing optional initial RAM disk components that should be loaded at runtime. For instance, in one implementation, an options bitmap is stored in the field 702J that identifies the optional initial RAM disk components that are to be loaded at runtime. The contents of the bitmap may be set by a setup utility, an application program, an OS, or in another manner.

In the embodiment wherein the disk images 608A-608N are utilized to store language support files, an application program might be utilized to specify the particular language that should be utilized by the OS. In response thereto, the application program might set the appropriate bits of the bitmap stored in the field 702J. At runtime, the contents of the options bitmap stored in the field 702J are examined to determine which of the disk images 608A-608N should be utilized to create the initial RAM disk. Additional details regarding this process will be provided below with regard to FIGS. 8-9.

Figure 8:
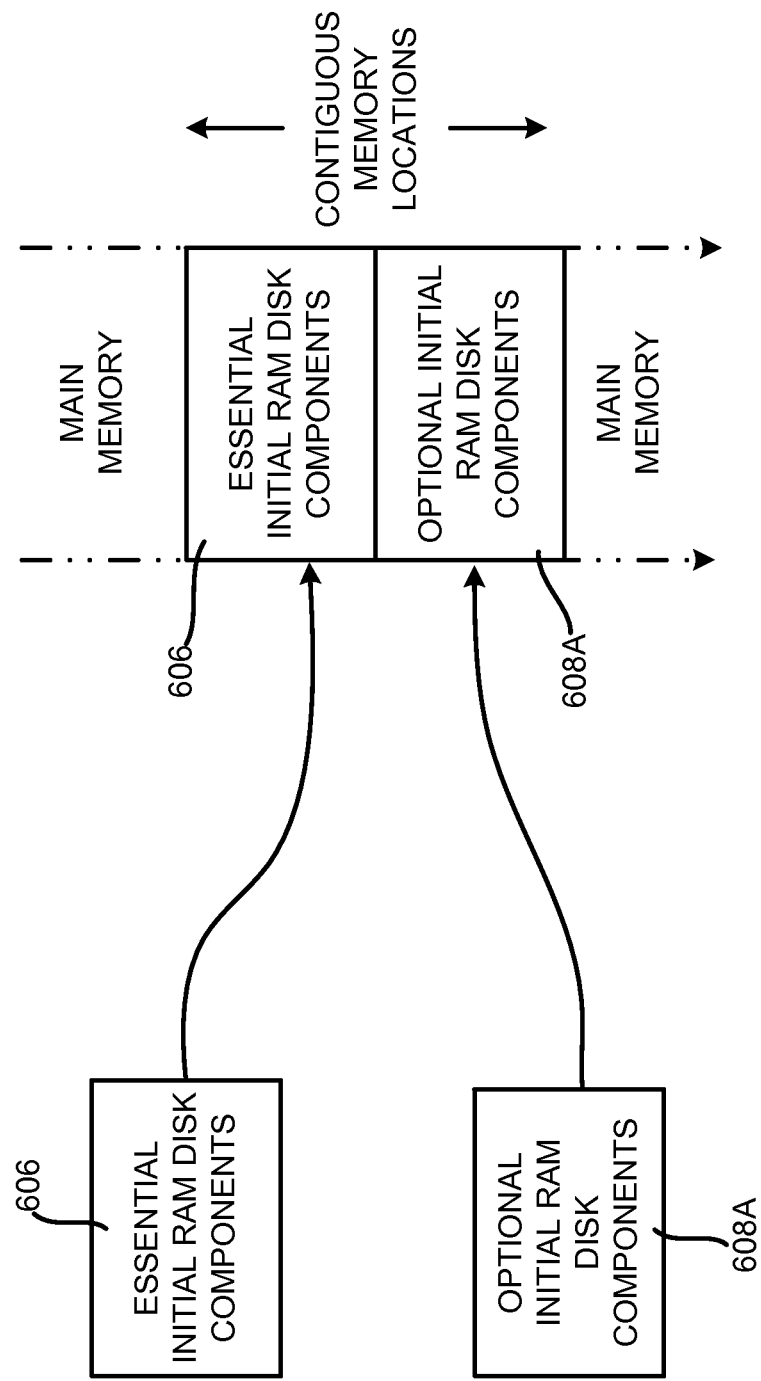
FIG. 8 is a data storage diagram showing aspects of the creation of an initial RAM disk according to one embodiment disclosed herein.

FIG. 8 is a data storage diagram showing aspects of the creation of an initial RAM disk according to one embodiment disclosed herein. In the example shown in FIG. 8, a single disk image 608A containing optional initial RAM disk components has been identified for use at runtime. In order to create the initial RAM disk, the disk image 606 containing the essential initial RAM disk components is first copied to the main memory 114. After the disk image 606 has been copied to the main memory 114, the disk image 608A is then copied to memory locations that are contiguous with the memory locations utilized to store the disk image 606. If additional disk images were to be utilized, the additional disk images would be copied to memory locations contiguous with the memory locations utilized to store the disk image 608A.

Once the disk image 606 storing the essential initial RAM disk components and the disk images storing the optional initial RAM disk components have been copied to the main memory 114, the in-memory file system for the initial RAM disk is created using the disk image 606 and the disk image 608A stored in the main memory 114. In particular, any optional initial RAM disk components are overlaid upon the in-memory file system created from the essential initial RAM disk components. In this manner, one in-memory file system is created that includes the components from the disk image 606 containing the essential initial RAM disk components and the disk images, such as the disk image 608A, that include optional initial RAM disk components.

Figure 9:
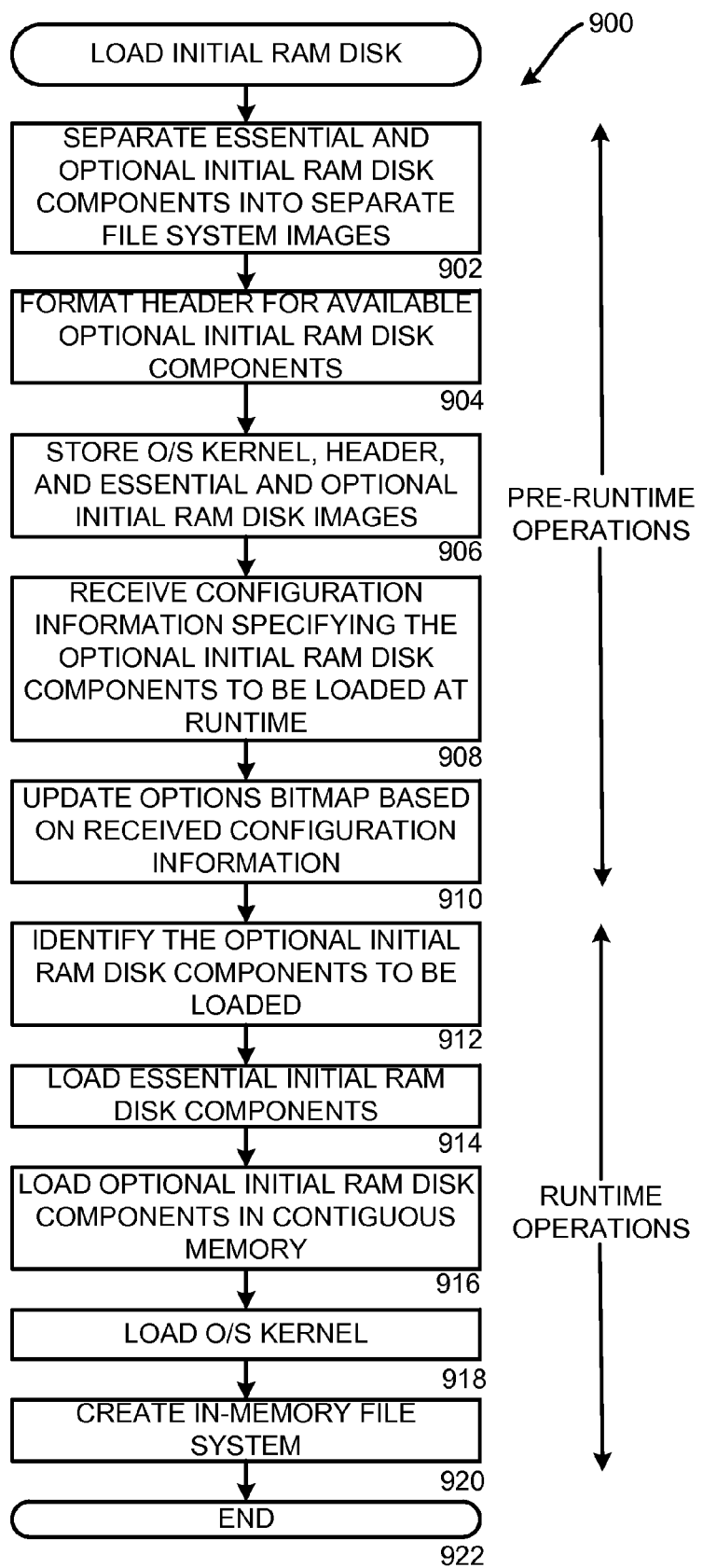
FIG. 9 is a flow diagram showing one illustrative routine disclosed herein for efficiently loading disk images to create an initial RAM disk according to one embodiment disclosed herein.

FIG. 9 is a flow diagram showing one illustrative routine 900 disclosed herein for efficiently loading disk images to create an initial RAM disk according to one embodiment disclosed herein. The routine 900 begins at operation 902 where the essential and optional initial RAM disk components are separated into separate disk images. As discussed above, the optional initial RAM disk components might be separated into multiple disk images that might be loaded together or separately. From operation 902, the routine 900 proceeds to operation 904.

At operation 904, the header 602 is generated. In particular, the fields 702A-702J are specified. Once the header 602 has been generated, the routine 900 proceeds to operation 906, where the ram disk 602 containing the OS kernel, the disk image 606 containing the essential initial RAM disk components, and the disk images 608A-608N storing the optional initial RAM disk components are stored on disk or in nonvolatile memory. The routine 900 then proceeds from 906 to operation 908.

At operation 908, configuration information is received that specifies the optional initial RAM disk components that are to be loaded at runtime. As described above, a BIOS utility, application program, or OS feature might be provided for allowing a user to specify either directly or indirectly which of the optional initial RAM disk components should be utilized at runtime. Once the optional initial RAM disk components have been specified, the routine 900 proceeds to operation 910, where the field 702J storing the options bitmap described above is updated to reflect the received configuration information. As discussed above, appropriate bits might be set in the options bitmap to indicate the disk images storing optional initial RAM disk components that are to be loaded at runtime.

From operation 910, the routine 900 proceeds to operation 912, where the field 702J storing the options bitmap is utilized at runtime to determine the disk images 608A-608N containing optional initial RAM disk components that are to be loaded. Once the disk images 608A-608N storing optional initial RAM disk components to be loaded have been identified, the routine 900 proceeds to operation 914 where the disk image 606 storing essential RAM disk components 606 is loaded in the manner described above with regard to FIG. 8.

Once the disk image 606 has been loaded into the main memory 114, the routine 900 proceeds to operation 916. At operation 916, the disk images storing optional initial RAM disk components identified at operation 912 are also loaded into the main memory 114 in the manner discussed above with regard to FIG. 8. The routine 900 then proceeds to operation 918, where the disk image 604 containing the OS kernel is loaded. The routine 900 then proceeds to operation 920 where the in-memory file system for the initial RAM disk is created in the manner described above with regard to FIG. 8. As discussed above with respect to FIG. 8, any optional initial RAM disk components are overlaid upon the in-memory file system created from the essential initial RAM disk components. In this manner, one in-memory file system is created that includes the components from the disk image 606 containing the essential initial RAM disk components and the disk images, such as the disk image 608A, that include optional initial RAM disk components. The initial RAM disk may then be utilized by the OS kernel. From operation 920, the routine 900 proceeds to operation 922, where it ends.

Based on the foregoing, it should be appreciated that technologies for efficiently loading OS image files to create an initial RAM disk have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method comprising performing computer-implemented operations for:
   storing an image containing essential initial RAM disk components;
   storing one or more images containing optional initial RAM disk components, the optional initial RAM disk components comprising language support files;
   identifying the optional initial RAM disk components that are to be loaded at a runtime of a computer;
   loading the image containing the essential initial RAM disk components into a first plurality of memory locations;
   loading the identified optional initial RAM disk components into a second plurality of memory locations continuous with the first plurality of memory locations; and
   creating an in-memory file system utilizing the contents of the first and second plurality of memory locations.

2. The computer-implemented method of claim 1, further comprising storing a header comprising data identifying a start and an end of the image containing essential initial RAM disk components.

3. The computer-implemented method of claim 2, wherein the header further comprises data identifying a start and an end of the one or more images containing optional RAM disk components.

4. The computer-implemented method of claim 3, wherein the header further comprises a bitmap identifying the optional initial RAM disk components that are to be loaded at a runtime of the computer.

5. The computer-implemented method of claim 4, wherein identifying the optional initial RAM disk components that are to be loaded at a runtime of a computer comprises identifying the optional initial RAM disk components that are to be loaded at a runtime of a computer based upon the bitmap.

6. The computer-implemented method of claim 5, further comprising storing an image containing an operating system kernel with the image containing essential initial RAM disk components and the one or more images containing optional initial RAM disk components.

7. A non-transitory computer-readable storage medium having computer-executable instructions stored thereupon which, when executed by a computer, cause the computer to:
  store an image containing essential initial RAM disk components;
  store a plurality of images containing optional initial RAM disk components, the optional initial RAM disk components comprising language support files;
  identify the optional initial RAM disk components that are to be loaded at a runtime of a computer;
  load the image containing the essential initial RAM disk components into a first plurality of memory locations;
  load the identified optional initial RAM disk components into a second plurality of memory locations continuous with the first plurality of memory locations; and to
  create an in-memory file system utilizing the contents of the first and second plurality of memory locations.

8. The computer-readable storage medium of claim 7, having further computer-executable instructions stored thereupon which, when executed by the computer, cause the computer to store a header comprising data identifying a start and an end of the image containing essential initial RAM disk components.

9. The computer-readable storage medium of claim 8, wherein the header further comprises data identifying a start and an end of the one or more images containing optional RAM disk components.

10. The computer-readable storage medium of claim 9, wherein the header further comprises a bitmap identifying the optional initial RAM disk components that are to be loaded at a runtime of the computer.

11. The computer-readable storage medium of claim 10, wherein identifying the optional initial RAM disk components that are to be loaded at a runtime of a computer comprises identifying the optional initial RAM disk components that are to be loaded at a runtime of a computer based upon the bitmap.

12. The computer-readable storage medium of claim 11, having further computer-executable instructions stored thereupon which, when executed by the computer, cause the computer to store an image containing an operating system kernel with the image containing essential initial RAM disk components and the one or more images containing optional initial RAM disk components.

13. A computer system comprising:
  a central processing unit;
  a mass storage device storing an image containing essential initial RAM disk components and one or more images containing optional initial RAM disk components, the optional initial RAM disk components comprising language support files; and
  a memory storing instructions executable by the central processing unit which, when executed, cause the computer system to identify the optional initial RAM disk components that are to be loaded at a runtime of the computer system, load the image containing the essential initial RAM disk components into a first plurality of memory locations of the memory, load the identified optional initial RAM disk components into a second plurality of memory locations of the memory continuous with the first plurality of memory locations, and to create a file system in the memory utilizing the contents of the first and second plurality of memory locations.

14. The computer system of claim 13, wherein the mass storage device further stores a header comprising data identifying a start and an end of the image containing essential initial RAM disk components.

15. The computer system of claim 14, wherein the header further comprises data identifying a start and an end of the one or more images containing optional RAM disk components.

16. The computer system of claim 15, wherein the header further comprises a bitmap identifying the optional initial RAM disk components that are to be loaded at a runtime of the computer system.

17. The computer system of claim 16, wherein identifying the optional initial RAM disk components that are to be loaded at a runtime of a computer comprises identifying the optional initial RAM disk components that are to be loaded at a runtime of a computer based upon the bitmap.

18. The computer system of claim 17, wherein the bitmap can be modified in response to user instructions to create an updated bitmap, and wherein the updated bitmap is utilized at a next runtime of the computer to identify the optional initial RAM disk components that are to be loaded.

* * * * *